E. SILEN.
VIOLIN PIANO.
APPLICATION FILED SEPT. 24, 1915.

1,238,835.

Patented Sept. 4, 1917.
6 SHEETS—SHEET 1.

Witnesses

Erick Silen
Inventor,
by C.A. Snow & Co.
Attorneys.

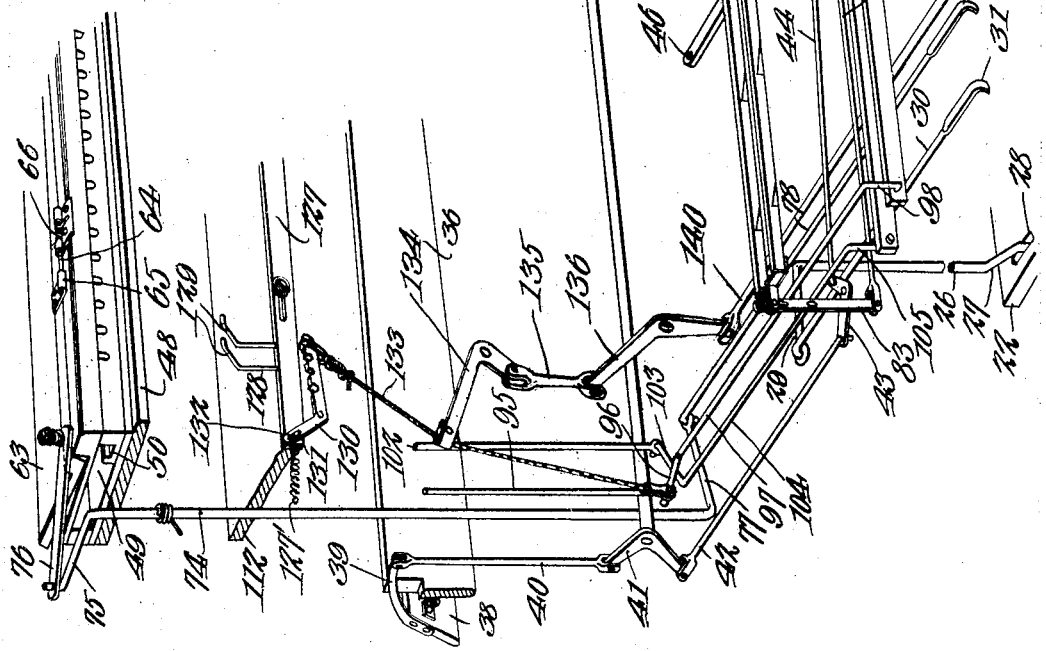

E. SILEN.
VIOLIN PIANO.
APPLICATION FILED SEPT. 24, 1915.
1,238,835.
Patented Sept. 4, 1917.
6 SHEETS—SHEET 4.
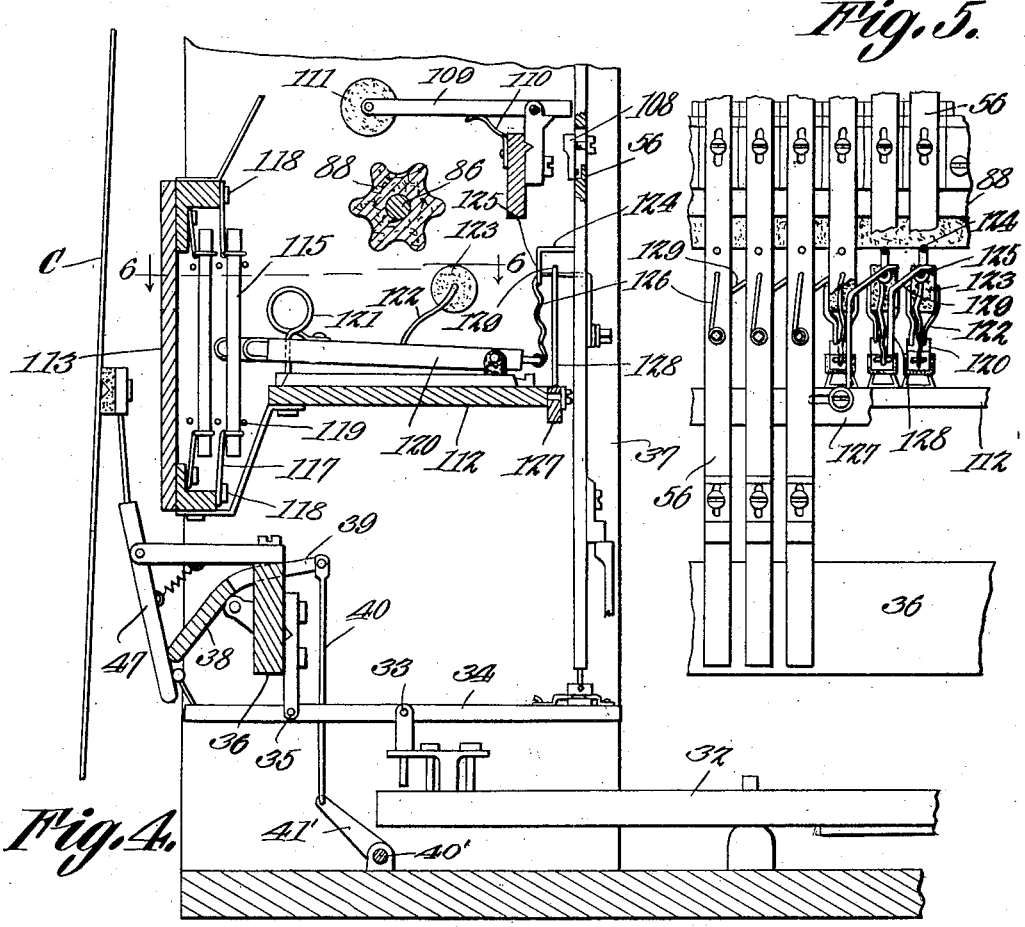
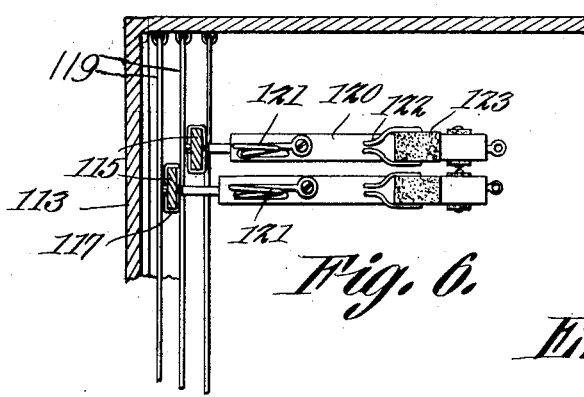

E. SILEN.
VIOLIN PIANO.
APPLICATION FILED SEPT. 24, 1915.
1,238,835.
Patented Sept. 4, 1917.
6 SHEETS—SHEET 5.
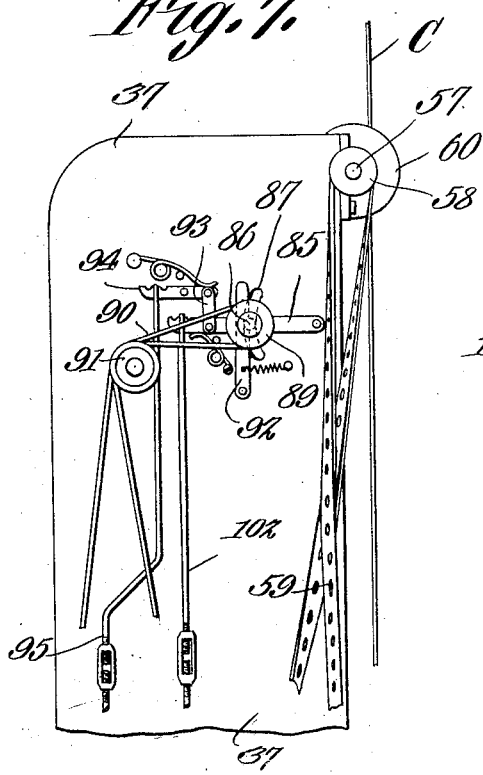
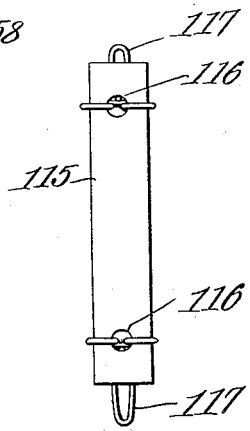
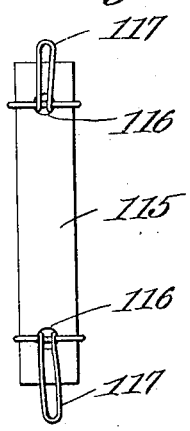
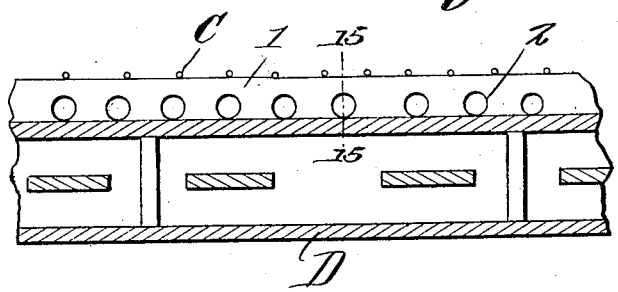
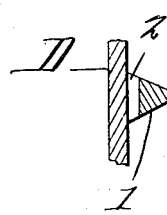
Witnesses
Erick Silen
Inventor,
by C. A. Snow & Co.
Attorneys.

E. SILEN.
VIOLIN PIANO.
APPLICATION FILED SEPT. 24, 1915.

1,238,835.

Patented Sept. 4, 1917.
6 SHEETS—SHEET 6.

Witnesses

Erick Silen
Inventor, by C. A. Snow & Co.
Attorneys.

UNITED STATES PATENT OFFICE.

ERICK SILEN, OF MAYGER, OREGON.

VIOLIN-PIANO.

1,238,835.  Specification of Letters Patent.  Patented Sept. 4, 1917.

Application filed September 24, 1915. Serial No. 52,422.

*To all whom it may concern:*

Be it known that I, ERICK SILEN, a citizen of the United States, residing at Mayger, in the county of Columbia and State of Oregon, have invented a new and useful Violin-Piano, of which the following is a specification.

This invention relates to violin pianos and is more especially an improvement upon the structure disclosed in Patents No. 1,045,899 issued to me December 3, 1912, and No. 1,115,601, issued to me on November 3, 1914.

One of the objects of the invention is the provision of operating mechanism which can be driven either by motor or by foot power, it being possible readily to disconnect the motor from or connect it to the mechanism of the instrument, the foot engaging portions of the drive mechanism remaining stationary unless employed for operating the parts of the instrument.

Another object is to provide bowing elements of improved form whereby the same are rendered more lasting and produce better tones than similar devices heretofore constructed.

A further object is to combine with the bowing action a mechanism for sounding chimes, means being employed whereby the chime sounding mechanism can be uncoupled from the bowing mechanism, thus to permit the sounding of the strings only of the instrument.

A further object is to provide mechanism whereby a tremolo effect may be produced both upon the strings and the chimes of the instrument while they are being played simultaneously, and while either loud or soft tones are being produced.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.
In the accompanying drawings the preferred form of the invention has been shown.

In said drawings—

Fig. 3 is a perspective view showing, diagrammatically the various controlling levers and the parts coupled thereto.

Fig. 4 is an enlarged vertical section through a portion of the instrument and showing the means for transmitting motion from a key to a tremolo apparatus and also showing a portion of the damper mechanism.

Fig. 5 is a front elevation of a portion of the structure shown in Fig. 4.

Fig. 6 is a section on the line 6—6 Fig. 4.

Fig. 7 is an enlarged elevation of a portion of the mechanism for actuating the wheel of the tremolo mechanism.

Fig. 8 is a front elevation of one of the chimes.

Fig. 9 is a rear elevation thereof.

Fig. 14 is a section through a portion of the sounding board and showing one of the bridges in elevation.

Fig. 15 is a section on line 15—15 Fig. 14.

Figure 1:
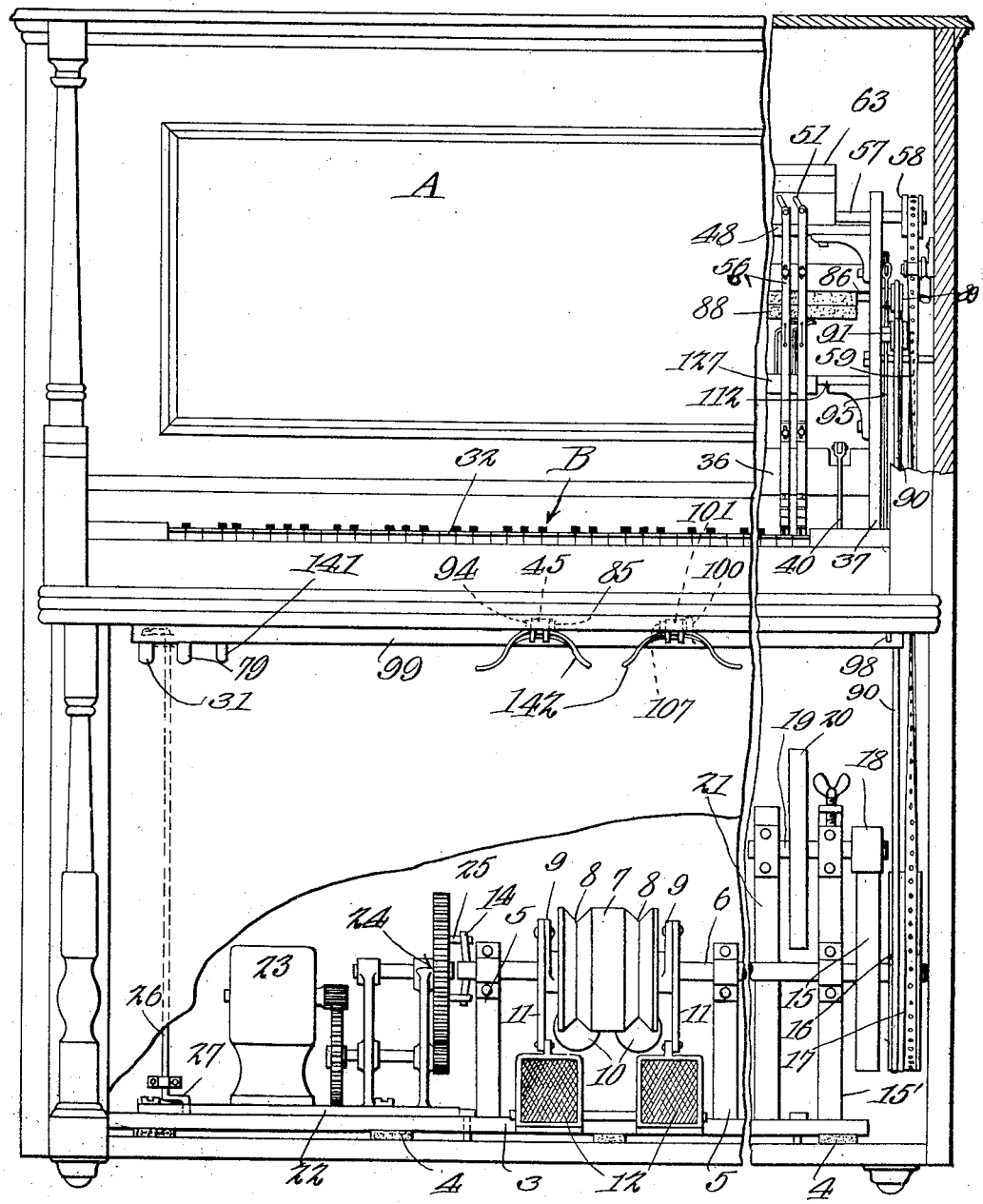
Figure 1 is a front elevation of the instrument embodying the present improvements, a portion thereof being broken away, to show 55 parts of the interior mechanism.

The general construction and arrangement of the parts of the instrument covered by this application is the same as that disclosed in my patents hereinbefore referred to. In the drawings, A designates the piano cabinet, B the keyboard, C the strings, and D the sounding board. Interposed between the sounding board D and the strings C are bridges 1 which differ from those disclosed in my patents before mentioned in that each is provided with openings 2.

Upstanding from a base strip 3 which is secured to the bottom of the cabinet 1 but is spaced therefrom by suitable sound deadening means such as pads 4, are standards 5 in which is journaled a drive shaft 6 having a clutch member 7 secured to it and formed with spaced annular grooves 8. Levers 9 are pivotally mounted on the shaft 6 close to the ends of the clutch member 7 and each lever is provided at its back end with a weighted dog 10 constituting a clutch member, while the other end of each lever is connected by a link 11 to a treadle 12 which is yieldingly supported, at one end by a spring 13. Each dog 10 is so mounted as to project into one of the grooves 8 in the member 7 and, when one of the treadles 12 is depressed against the action of its spring 13, it will cause the lever 9 connected thereto to swing upwardly at its rear end and the dog 10 on said lever to frictionally engage the walls of the adjacent groove 8, thus to rotate member 7 and shaft 6. Thus it will be seen that by producing an intermittent movement of the treadles 12, shaft 6 can be rotated continuously in one direction. Extending from one end of the shaft 6 are opposed fingers 14 constituting clutch members while the other end portion of the shaft is journaled in a standard 15' upstanding from the base strip 3 and has a friction disk 15 and pulleys 16 and 17 secured to it. Disk 15 meshes with a smaller disk 18 secured to the shaft 19 of a fly wheel 20, this shaft 19 being journaled in the standard 15' and also in a supplemental standard 21 upstanding from the base strip 3.

Mounted on the base strip 3 is a slide 22 adapted to slide in the direction of its length and which may be provided with any suitable form of guiding means. On this slide is arranged a motor 23 adapted to drive any suitable gearing. In the structure shown there is provided a train of speed reducing gears 24 one of which has outstanding fingers 25 adapted, when slide 22 is in one position, to project between the fingers 14 on the shaft 6, thus to couple said shaft to the train of gears whereby operation of the motor 23 will result in the rotation of shaft 6. This motor is especially designed for use while the instrument is being played by children who are too small or not strong enough to operate the treadles 12. The gearing 24 is adapted to be moved into and out of connection with the shaft 6 by a vertical shaft 26 suitably mounted in the cabinet A and provided at its lower end with a crank arm 27 which works within a transverse slot 28 formed in the slide 22. Another crank arm 29 is provided at the upper end of the shaft 26 and is pivotally engaged by an actuating rod 30 extending forwardly through the cabinet and under the keyboard, the outer or front end of this rod being provided with a handle 31. It will be apparent that by pressing inwardly on the handle 31, shaft 26 will be rotated so as to shift slide 22 toward one side of the piano to disengage the motor driven gears from the shaft 6. By reversing the movement of the handle 31, slide 22 will be shifted toward the standard 5, thus to couple the gears 24 to the shaft 6.

The keys 32 of the instrument are mounted as ordinarily, the rear end portion of each key being pivotally connected, as at 33, to a lever 34 pivotally connected, as at 35, to a transverse rail 36 secured within a frame 37 mounted in the upper portion of the cabinet A. Hingedly connected to rail 36 is a damper controlling plate 38 having arms 39 connected, by links 40, to a bell crank lever 41 and a lever 41' respectively, said levers 41 and 41' being secured to a revoluble rod 40'. A rod 42 connects bell crank lever 41 to another bell crank lever 43 which, in turn, has a push rod 44 extending therefrom and into the path of a knee lever 45 arranged under the keyboard and which lever is pivoted as at 46. Thus when the knee lever is thrust in one direction it will push through rod 44 against bell crank lever 43 and motion will thus be transmitted through the rods 42 and 40 and their lever 41 to arm 39 with the result that the plate 38 will be swung rearwardly toward the strings C. Each lever 34 is adapted, when actuated by its key 32, to thrust against the lower end of a damper lever 47, thus to shift the damper out of contact with the strings C adjacent thereto. By providing means for shifting the plate 38, and for holding said plate in shifted position, the damper lever is held against movement so that the vibration of the string will not be terminated by the damper when the key 32 is released.

Figure 12:
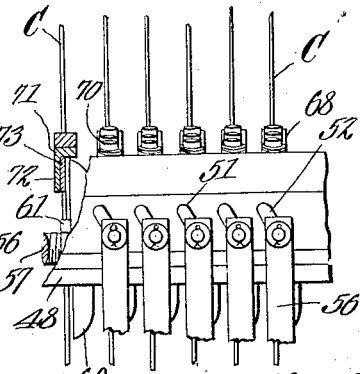
Fig. 12 is a front elevation of the structure shown in Fig. 10.
Figure 11:
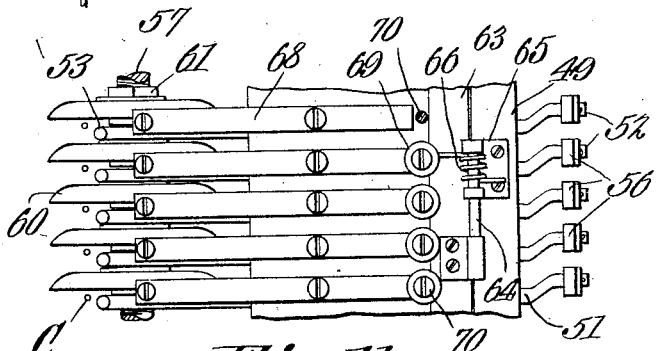
Fig. 11 is a plan view of the structure shown in Fig. 10.

Arranged within the upper portion of the frame 37 is a cross strip 48 on which is mounted a housing 49 extending throughout the length of the strip and provided with a longitudinal channel 50 in the bottom portion thereof. Journaled within the walls of the housing 49 are controlling rods 51 each of which is provided, at its front end, with a crank arm 52 and, at its other end, with a shifting finger 53. In order that the crank arms may be made long enough to give desired leverage, they are preferably extended downwardly and laterally as shown particularly in Fig. 12, instead of being extended horizontally. Each rod is crimped between its ends, as shown at 54, the crimped portion being adapted to oscillate within the channel 50. A spring 55 is coiled about each of the rods 51 and is secured at one end to the rod and bears, at its other end, upon the bottom of the housing 49. These springs serve to hold the fingers 53 normally pressed laterally in one direction. Each of the crank arms 52 is connected by a rod 56 to one of the levers 34 so that, when said lever 34 is actuated by a key 32, the rod 56 coupled to the lever will be lifted to swing finger 53 out of its normal position.

Figure 13:
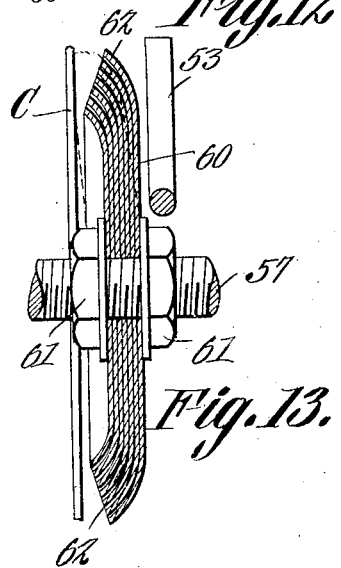
Fig. 13 is an enlarged section through one of the bowing disks.

Journaled in the upper portions of the sides of frame 37 is a shaft 57 to which is secured a pulley 58 receiving motion through a crossed belt 59 from the pulley 17. This shaft is located between the strings C and the strip 48 and is parallel with said cross strip. Secured to the shaft 57 are spaced bowing disks 60 each of which is made up of a series of nested concavo-convex members clamped together between nuts 61 on the shaft 57, each bowing disk being extended between two of the strings C. The periphery of the bowing disk 60 is beveled, as shown particularly at 62 in Fig. 13 and the members making up each disk are formed of flexible material so that, when the finger 53 supported adjacent the disk is swung out of its normal position in the manner hereinbefore pointed out, that portion of the disk engaged by the finger will be flexed laterally to bring the beveled periphery of the disk flat against the adjacent string C, as indicated by dotted lines in Fig. 13.

It is to be understood that one bowing disk is provided for each string C and that any one of these bowing disks can be brought into position to vibrate its string, merely by depressing the proper key of the keyboard, so that the parts controlled by the key will be set in motion and the disk flexed as pointed out.

Located at the top of housing 49 is a strip 63. To this strip 63 are connected the pintles 64 of the hinges and said pintles are adapted to slide within the hinge members 65 which are attached to the housing 49. Springs 66 are mounted on the pintles and serve to hold strip 63 normally pressed downwardly toward the housing. This downward movement of the strip relative to the housing is limited by anti-friction rollers 67 which are connected to the bottom of the strip 63 and bear downwardly on the housing, said rollers reducing friction during the sliding movement of the strip 63 along the housing.

Figure 10:
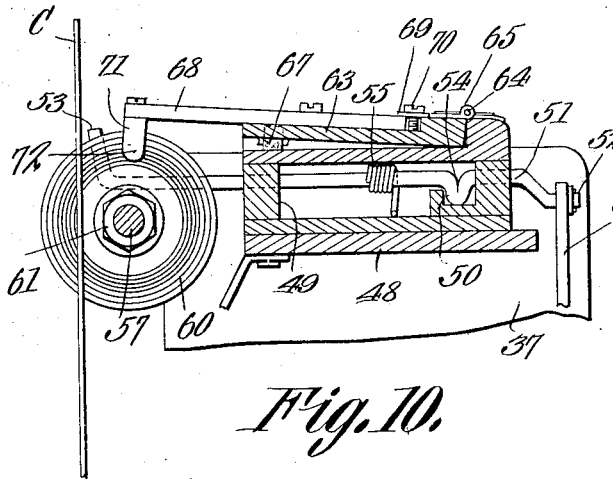
Fig. 10 is an enlarged transverse section through a portion of the structure and showing one of the resin applying devices, a bowing disk, and adjacent parts.

Pivotally connected to the strip 63 are arms 68 the inner end of each arm being lapped by the head 69 of a clamping screw 70. By loosening this screw the arm 68 can be adjusted angularly and then by tightening the screw 70 the arm 68 will be securely held against further movement. The number of arms 68 is equal to the number of bowing disks, and secured to the outer end of each arm 68 is a block 71 having a depending tongue 72 lapping the adjacent bowing disk and provided, on its inner or active face, with a layer of rosin, such as indicated at 73. This rosin is supported at that side of the disk adapted to engage the string C, but the rosin is held in front of the string, as shown in Fig. 10. Obviously when the strip 63 is shifted longitudinally, all of the blocks 71 will be shifted and rosin will thus be applied to the active faces of all of the bowing disks.

For the purpose of shifting the strip 63 longitudinally a vertical shaft 74 is provided, this shaft having a crank arm 75 at its upper end connected by a link 76 to one end of the strip 63. The lower end of the shaft has a crank arm 77 and extending forwardly from this crank arm is an actuating rod 78 projecting under the keyboard and provided at its front end with a handle 79. Obviously by pulling outwardly on the handle 79 the shaft 74 will be rotated and will thrust, through crank 75 and link 76, against strip 63, thus to shift said strip longitudinally and bring the rosin against the respective bowing disks.

Extending transversely under the keys 32 are parallel stop strips 80 suitably connected so as to work together and provided, at intervals, with notches 81 extending thereinto from the lower edges thereof, the upper walls of the notches being inclined and normally bearing downwardly on deflecting blocks 82 supported under the stop strips 80. When the stop strips are in their normal positions, the blocks 82 are completely seated in the notches 81. When, however, said strips 80 are moved longitudinally in one direction, they will ride upwardly on the blocks 82 and thus be brought nearer the lower edges of the keys 32 with the result that the downward movement of the keys will thus be limited. By thus limiting the movement of the keys, the amount of pressure exerted by the bowing disks upon the strings C can be controlled. When a key is capable of moving downwardly its full distance, the finger 53 will press the bowing disk tightly against the string. When, however, the key can only move a short distance downwardly, the movement of finger 53 will be so limited that only a light pressure of the bowing disk against the string will result.

For the purpose of shifting the strips 80 and thus limiting the downward movement of the keys 32, a lever 83 is provided, this lever being slidably and pivotally connected above its fulcrum, to the strips 80 and, below its fulcrum, to a spring-controlled rod 84 having a hooked end 85 engaging one side of the knee lever 45. The knee lever 45 extends between the end of rod 44 and the hooked end 85 of rod 84 so that when said lever is thrust in one direction it pushes against rod 44 as hereinbefore described and, when swung in the opposite direction, pulls through rod 84 upon lever 83 and thus shifts the strips 80 longitudinally to cause them to ride upwardly on the blocks 82.

Pivotally mounted upon the sides of the frame 37 are levers 85 in which is journaled a shaft 86 extending through arcuate slots 87 in the sides of the frame 37. Secured to this shaft so as to rotate therewith is a longitudinally corrugated roller 88 and a pulley 89 is secured to the shaft and is adapted to receive motion through a belt 90 passing over two guide pulleys 91 and driven by the pulley 16. A spring controlled holding lever 92 engages shaft 86 close to the pulley 89 and serves to hold said shaft 86 in any position to which it may be adjusted upwardly and downwardly. Lever 85 is connected by a link 93 to a spring pressed lever 94. A rod 95 extends downwardly from each lever 94 and is pivotally connected, at its lower end, to a crank arm 96 at the back end of a shaft 97 mounted for rotation in the cabinet. This shaft 97 has a crank arm 98 at its front end. The crank arms 98 on the two shafts 97 are pivotally connected to the end portions of a bar 99 from which extends an ear 100 engaging one side of a knee lever 101 extending outwardly from under the keyboard.

Extending downwardly from each lever 85 is a rod 102 pivotally connected at its lower end to a crank arm 103 located at the back end of a shaft 104 mounted for rotation in the cabinet. The front ends of the shafts 104 are provided with depending crank arms 105 engaging a bar 106 which is back of and parallel with the bar 99. This bar 106 has an ear 107 and the knee lever 101 extends between this ear 107 and the ear 100. Consequently when the knee lever is thrust in one direction it will thrust against the ear 100 and cause the shafts 97 to rotate simultaneously and the crank arms 96 to swing downwardly simultaneously. This will result in pulling through the rods 95 upon the levers 94 which will pull upwardly through links 93 on lever 85. Therefore the shaft 86 will be elevated within the frame 37. However, when knee lever 101 is shifted in the opposite direction, it will push against ear 107 and cause the bar 106 to rotate the shafts 104. These shafts will pull downwardly on the rods 102 and thus pull levers 85 downwardly and lower shaft 86 in the frame 37. In this manner the corrugated roller 88 can be raised and lowered.

Extending backwardly from each of the rods 56 is an adjustable lug 108 and pivotally mounted back of each rod 56 is a lever 109 yieldingly supported by a spring 110 so as to overhang roller 88. Each lever 109 has a short arm overhanging the lug 108 on the adjacent rod 56 and a long arm overhanging the roller 88 and provided with an antifriction roller 111.

By providing the lever 109 and the parts coöperating therewith, it will be apparent that while a bowing disk is being held against its string in the manner hereinbefore described, the lug 108 will be close to or in contact with the short arm of the adjacent lever 109. Consequently by elevating shaft lever 86 as hereinbefore pointed out, the roller on said shaft will be brought into engagement with roller 111, thus setting up a rapid oscillation of lever 109 with the result that rod 56 will be rapidly reciprocated and the bowing disk will be rapidly released from and pressed back into engagement with its string. This will produce a tremolo effect. By returning shaft 86 to its intermediate position, the tremolo effect will be eliminated.

Secured to the frame 37 and to the strip 48 and another lower strip 112 which is within the frame 37, is a rack 113 supporting chimes or orchestra bells. The tubes or bars 115 of these chimes or orchestra bells are provided with apertures 116 adjacent their ends through which cords 117 are looped, these cords being attached to buttons 118 secured to the upper and lower portions of the rack 113. Spacing cords 119 are stretched between the bars 115 and serve to prevent the bars from coming into contact with each other while being vibrated.

Pivotally mounted on the strip 112 is a series of hammers 120 each of which is normally supported yieldingly at its rear end by a spring 121 and has its front end close to and normally out of contact with the adjacent bar 115. The hammers 120 are so positioned, however, that when swung outwardly they will come back against their respective bars and sound them. One of these hammers is provided for each of the bells 115 and extending upwardly from each of the hammers 120 is an arm 122 carrying a roller 123 which is located below the roller 88.

Figure 2:
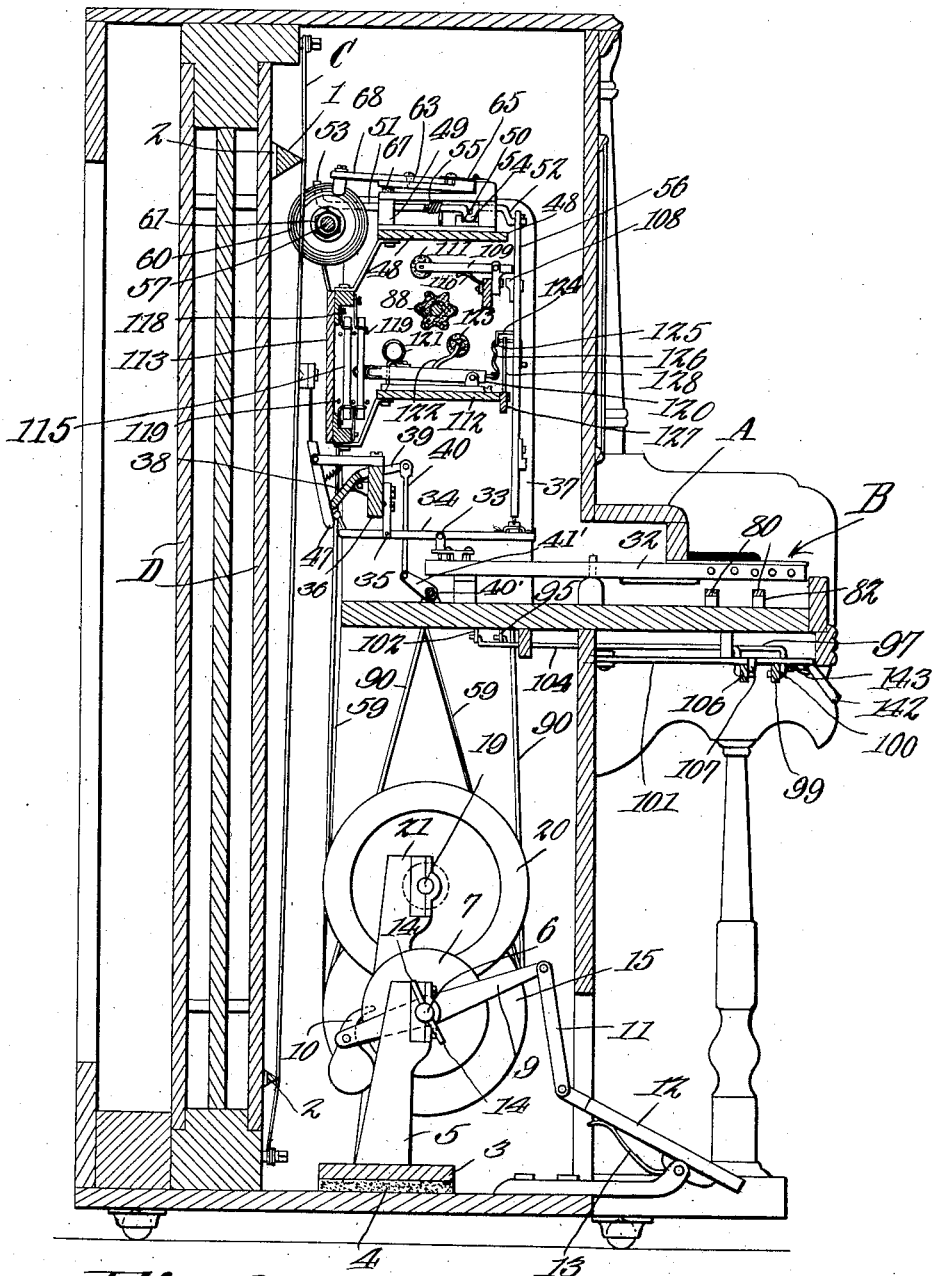
Fig. 2 is a central vertical longitudinal section through the instrument.

Extending rearwardly from each of the rods 56 is an arm 124 having a depending eye 125 through which extends a cord 126, one end of the cord being attached to the rod 56 while the other end is attached to the short arm of the adjacent hammers 120. This cord 126 is slack, as shown particularly in Fig. 2, so that when the rod 56 is raised to shift the bowing disk 60 it will move the hammer 120 but slightly out of its normal position this movement, however, being sufficient to bring roller 123 in position for engagement by roll 88. Should it be desired to play the bells independently of the strings C a means is employed for taking up the slack in the cord 126. This means includes a strip 127 slidably mounted upon the front portion of the cross strip 112 and provided with upstanding arms 128 from the upper ends of which extend laterally inclined fingers 129 terminating in substantially horizontal portions. One of these arms 128 is provided for each hammer 120 and the fingers 129 extend over those portions of the cord 126 located between eyes 125 and rods 56. Consequently when the strip 127 is shifted longitudinally in one direction, the inclined fingers 129 will ride over those portions of the cord in engagement therewith and deflect them downwardly, thus taking up the slack in each cord. Thus when rod 56 is raised a short distance by the slight depression of a key motion will also be transmitted from said rod through cord 126 to hammer 120 with the result that one of the bars 115 will be sounded before the disk 60 can be flexed.

Strip 127 is held normally in one position by a spring 127'.

For the purpose of shifting the strip 127 and producing a tremolo simultaneously on the bells and strings a bell crank lever 130 is provided, this lever having a longitudinal slot 131 into which projects a pin 132 extending from the strip 127. A cord or wire 133 is adjustably connected at one end to one arm of the bell crank lever 130 and at its other end to bell crank arm 96. An intermediate portion of the cord engages one end of a bell crank lever 134 connected by a link 135 to a bell crank lever 136. A rod 140 is pivotally connected to the lever and extends forwardly under the keyboard. This rod has a handle 141 at its front end. When rod 99 and shaft 97 are shifted by lever 101 to raise roller 88 for producing a tremolo on the strings, lever 96 pulls through wire or cord 133 to shift strip 127 and pull through the cords 126 to raise the hammers 120. Thus when a key is depressed and rod 56 raised both the selected bell and the selected string will be sounded with a tremolo effect. If it should not be desired to use the bell tremolo the handle 141 is pushed inwardly to swing lever 134 and relieve the tension on cord or wire 133. Spring 127' will thus pull strip 127 back to normal position and the cords 126 will allow the hammers to drop back from roller 88. Only a tremolo on the strings will be produced.

It is to be understood that when one or more keys are depressed the corresponding string or strings will be sounded lightly. However, should a louder tone be desired the lever 45 is pushed to the left, thus shifting the damper and for producing a very soft tone the said lever is pushed to the right with the result that rod 84 pulls on lever 83 and shifts the strips 80, thus elevating the strips and materially lessening the downward movement of the keys.

For the purpose of producing a tremolo on the string, knee lever 101 is shifted to the right, thus raising roller 88 until it comes into contact with the roller 111 which, when moved upwardly and downwardly will cause the oscillating lever 109 to reciprocate the rod 56.

To the outer end of each of knee levers 45 and 101 is pivotally connected a knee engaging yoke 142 and springs 143 are employed for holding the yokes in any positions to which they may be adjusted angularly. These yokes can be adjusted so as to fit to persons of different sizes.

What is claimed is:—

1. In an instrument of the class described, a string, a shaft, mechanism for rotating the shaft, a bowing disk secured to and revoluble with the shaft and comprising a plurality of nested flexible members, the periphery of the disk being beveled, and means for flexing the disk to shift the beveled periphery of the disk into parallelism and engagement with the string, said disk contacting with the string throughout the width of the periphery of the disk.

2. An instrument of the class described including a string, a bowing disk, a key, a rod movable by the key, means operated by the rod for flexing the disk into contact with the string, means for rotating the disk, a resonant member, means for vibrating the same, a flexible connection between said vibrating means and the rod, and means for tightening said flexible connection to shift the vibrating means out of normal position.

3. In an instrument of the class described, a string, a key, a rod actuated by the key, means controlled by the rod for vibrating the string, a resonant element, a hammer for sounding said element, a flexible connection between said hammer and the rod, said connection permitting movement of the rod independently of said hammer, and means for tightening the connection to shift the hammer.

4. In an instrument of the class described, the combination with a string, a bowing element adjacent thereto, a key, a rod actuated by the key, and means operated by the rod for shifting the bowing element into active position relative to the string to sound the string, a resonant element, a hammer adjacent thereto, a flexible connection between said hammer and the rod, a lever, means upon the rod for engagement by the lever when said rod is elevated, a corrugated roller mounted for rotation between said lever and the hammer, means for shifting said roller upwardly and downwardly, means for rotating the roller when in any of its positions, and means upon the lever and hammer respectively for engagement by the roller when moved to its raised or lowered position respectively, and means for tightening the connection between the hammer and the rod to lift the hammer toward the roller.

5. The combination with a key, a rod actuated thereby, a resonant element, and a hammer, of a support carried by the rod, a flexible connection between the rod and the hammer, said connection engaging the support, a slidably mounted deflecting finger normally overhanging a portion of said connection, and means for shifting said finger to tighten the connection.

6. In an instrument of the class described, a string, a resonant bar, separate means for vibrating the string and bar respectively, a key, separate means operated by the key for operating the respective vibrating means, a longitudinally corrugated roller, means for rotating the same, means for shifting the roller in either of two directions during the rotation thereof, and separate means coöperating with the roller for producing an intermittent movement of the respective vibrating means, thereby to effect a tremolo on the string or bar.

7. In an instrument of the class described, a rack, bars, flexible connections between the ends of the bars and the rack, flexible spacing elements interposed between the bars, a hammer for each bar, a key, a rod operated by the key, a support extending from the rod, a flexible connection between each hammer and the adjacent rod, said connection engaging the support on the rod, there being a key and rod for each hammer, and means for simultaneously tightening all of the connections, said rods and the taut connections constituting means for operating the hammer to sound the bars.

8. In an instrument of the class described, a rack, bars, flexible connections between the ends of the bars and the rack, flexible spacing elements interposed between the bars, a hammer for each bar, a key, a rod operated by the key, a support extending from the rod, a flexible connection between each hammer and the adjacent rod, said connection engaging the support on the rod, there being a key and rod for each hammer, means for simultaneously tightening all of the connections, said rods and the taut connections constituting means for operating the hammers to sound the bars, a roller mounted for rotation above the hammers and having longitudinal corrugations, said roller being shiftable toward and from the hammers, and means carried by the respective hammers for engagement by the corrugated roller to effect a rapid movement of the hammers.

9. The combination with a sounding member, a hammer, a key operated rod and a flexible connection between said rod and the hammer, a slidable member, means carried by the slidable member to engage the connection to draw it taut, a lever for shifting said member, a crank arm, a flexible connection between the lever and the crank arm, a knee lever for actuating said crank arm, and means under the control of the performer for tightening and loosening said connection between the crank arm and lever.

10. The combination with a bowing disk, a key operated rod, and means operated by the rod for flexing the bowing disk, of a lever normally out of contact with but in position to engage and actuate the rod, a sounding bar, a hammer adjacent thereto, a flexible connection between the hammer and the rod, a revoluble member disposed under the lever, a knee lever, means operated thereby for shifting said revoluble member upwardly to engage the first named lever, a slidably mounted deflecting finger normally overhanging the flexible connection between the hammer and the rod, means operated by the knee lever during the elevation of the revoluble member for shifting said finger to tighten the flexible connection between the hammer and the rod and to lift the hammer into position for actuation by the revoluble member, said means including a flexible connection, and means under the control of the performer for holding said connection taut or slack.

In testimony that I claim the foregoing as my own, I have hereto affixed my signature in the presence of two witnesses.

ERICK SILEN.

Witnesses:
J. B. E. BOURNE,
MINA E. NUTT.

Copies of this patent may be obtained for five cents each, by addressing the "Commissioner of Patents, Washington, D. C."